(12) United States Patent
Stewart

(10) Patent No.: US 8,493,946 B2
(45) Date of Patent: Jul. 23, 2013

(54) IDENTIFYING A DESIRED MESH NETWORK IN A MULTIPLE NETWORK ENVIRONMENT

(75) Inventor: Damon M. Stewart, Provo, UT (US)

(73) Assignee: Digi International Inc., Minnetonka, MN (US)

( * ) Notice: Subject to any disclaimer, the term of this patent is extended or adjusted under 35 U.S.C. 154(b) by 749 days.

(21) Appl. No.: 12/243,737

(22) Filed: Oct. 1, 2008

(65) Prior Publication Data

US 2010/0080200 A1  Apr. 1, 2010

(51) Int. Cl.
*H04W 4/00* (2009.01)

(52) U.S. Cl.
USPC .............................. 370/338; 370/328

(58) Field of Classification Search
USPC .......................................... 370/338
See application file for complete search history.

(56) References Cited

U.S. PATENT DOCUMENTS

| | | | |
|---|---|---|---|
| 7,554,941 B2 * | 6/2009 | Ratiu et al. | 370/328 |
| 7,606,173 B2 * | 10/2009 | Lal | 370/254 |
| 7,663,502 B2 * | 2/2010 | Breed | 340/12.25 |
| 7,990,896 B1 * | 8/2011 | Delker et al. | 370/255 |
| 2004/0166854 A1 * | 8/2004 | Longacre | 455/435.1 |
| 2006/0056331 A1 * | 3/2006 | Ratiu et al. | 370/316 |
| 2006/0056363 A1 * | 3/2006 | Ratiu et al. | 370/338 |
| 2006/0195554 A1 * | 8/2006 | Payne et al. | 709/219 |
| 2007/0110017 A1 * | 5/2007 | Fulknier et al. | 370/338 |
| 2008/0057872 A1 * | 3/2008 | McFarland et al. | 455/66.1 |
| 2008/0181159 A1 * | 7/2008 | Metzler et al. | 370/312 |
| 2008/0304427 A1 * | 12/2008 | Biswas et al. | 370/255 |
| 2008/0310350 A1 * | 12/2008 | Dykema et al. | 370/328 |
| 2009/0059814 A1 * | 3/2009 | Nixon et al. | 370/254 |
| 2009/0059934 A1 * | 3/2009 | Aggarwal et al. | 370/401 |
| 2009/0168703 A1 * | 7/2009 | Pandey et al. | 370/329 |
| 2010/0149967 A1 * | 6/2010 | Johansen | 370/225 |
| 2010/0302947 A1 * | 12/2010 | Leppanen et al. | 370/241 |
| 2011/0019651 A1 * | 1/2011 | Fulknier et al. | 370/338 |
| 2011/0090834 A1 * | 4/2011 | Hares et al. | 370/312 |

* cited by examiner

*Primary Examiner* — Brandon Renner
*Assistant Examiner* — Faisal Choudhury
(74) *Attorney, Agent, or Firm* — Fogg & Powers LLC

(57) ABSTRACT

Network devices in a multi-network wireless mesh network environment identify themselves as members of the network by receiving a broadcast message from a first mesh network device that has joined the wireless mesh network, and identifying that the broadcast transmission has been received such as by actuating a light, playing a sound, or sending an identifying reply message back to a broadcasting mesh network device.

20 Claims, 2 Drawing Sheets

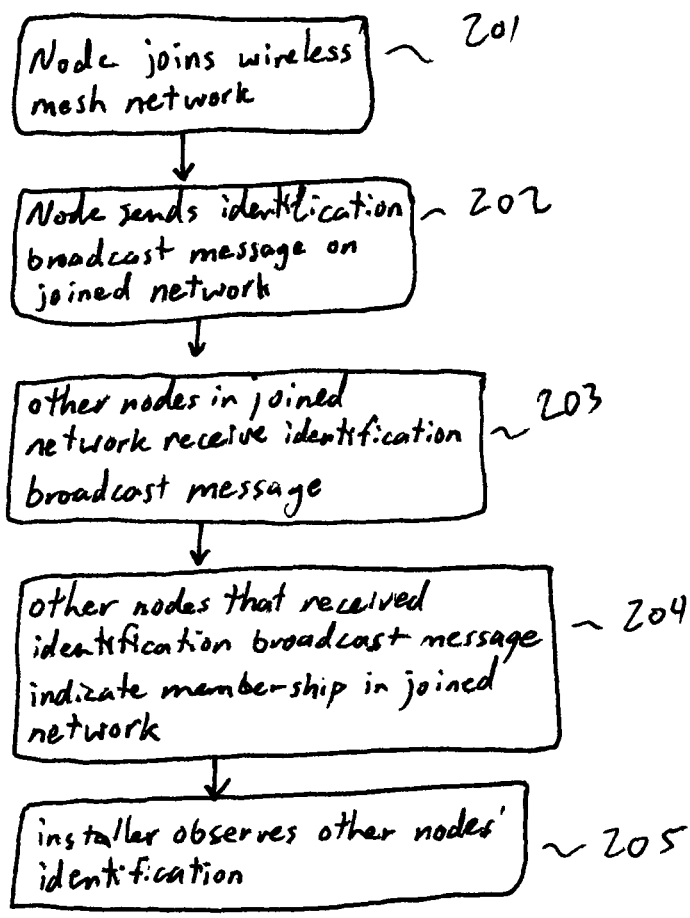

IDENTIFYING A DESIRED MESH NETWORK IN A MULTIPLE NETWORK ENVIRONMENT

FIELD OF THE INVENTION

The invention relates generally to mesh networks, and more specifically in one embodiment to identifying a desired wireless mesh network in a multiple wireless mesh network environment.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Although computer networks have become relatively common both in office and in home networking environments, such networks are typically fairly sophisticated and require significant processing power, electrical power, and infrastructure to work well. Some networking applications do not require so robust a network environment, but can benefit from the ability to provide electronic communications between devices.

One such example is the Bluetooth technology that enables a cell phone user to associate and use an earpiece in what is sometimes referred to a personal area network or PAN. Another example is a mesh network, in which a number of devices work together to form a mesh, such that data can be sent from a source device to a destination device via other devices in the mesh network.

Mesh networks often include multiple links from a network node to other network nodes nearby, and can thereby provide routing around broken links or paths by discovering other routes through the mesh to a destination node. New nodes to a mesh network are typically able to automatically discover the mesh network when they are activated in the vicinity of a compatible mesh network, and can easily join or synchronize with the network.

But, joining a mesh network becomes somewhat more complex in network environments where different frequencies or network identifiers are used. In ZigBee mesh networks, for example, different frequencies or channels can be used for different networks, such as to prevent nodes from one network from interfering with another network. A new node wishing to join a network must therefore find the appropriate frequency or channel being used by the intended network before it can join the intended network. This is performed in one example by searching among the various available channels until a mesh network is found, but confirming that the node has joined the intended network is difficult.

In addition to searching various frequencies or channels, some wireless mesh network technologies also use a network identifier, such as the PAN ID used in ZigBee networks. If a device receives data on a given channel but the data does not contain an identifier that matches the PAN ID of the network that has been joined, the data will be discarded as belonging to another mesh network. In ZigBee, node devices can be set to search for a particular PAN ID and join only that network, or can search for any available network and inherit the PAN ID of a network once it is found.

In environments where only one mesh network is present, new nodes will be able to quickly find and join the network. But, if multiple wireless mesh networks are present, it is difficult to determine which network a new network device has joined. There exists a need to provide wireless mesh network technology that addresses joining an intended network in a network environment with multiple mesh networks.

SUMMARY

Various embodiments of the invention comprise network nodes and methods of identifying other nodes that are members of a wireless mesh network, such as in a multi-network environment. Network devices in a wireless mesh network environment identify themselves as members of the network by receiving a broadcast message from a first mesh network device that has joined the wireless mesh network, and identifying that the broadcast transmission has been received such as by actuating a light, playing a sound, or sending an identifying reply message back to a broadcasting mesh network device.

BRIEF DESCRIPTION OF THE FIGURES

FIG. 2 is a flowchart illustrating a method of identifying a wireless mesh network in a multi-network environment, consistent with an example embodiment of the invention.

DETAILED DESCRIPTION

Figure 1:
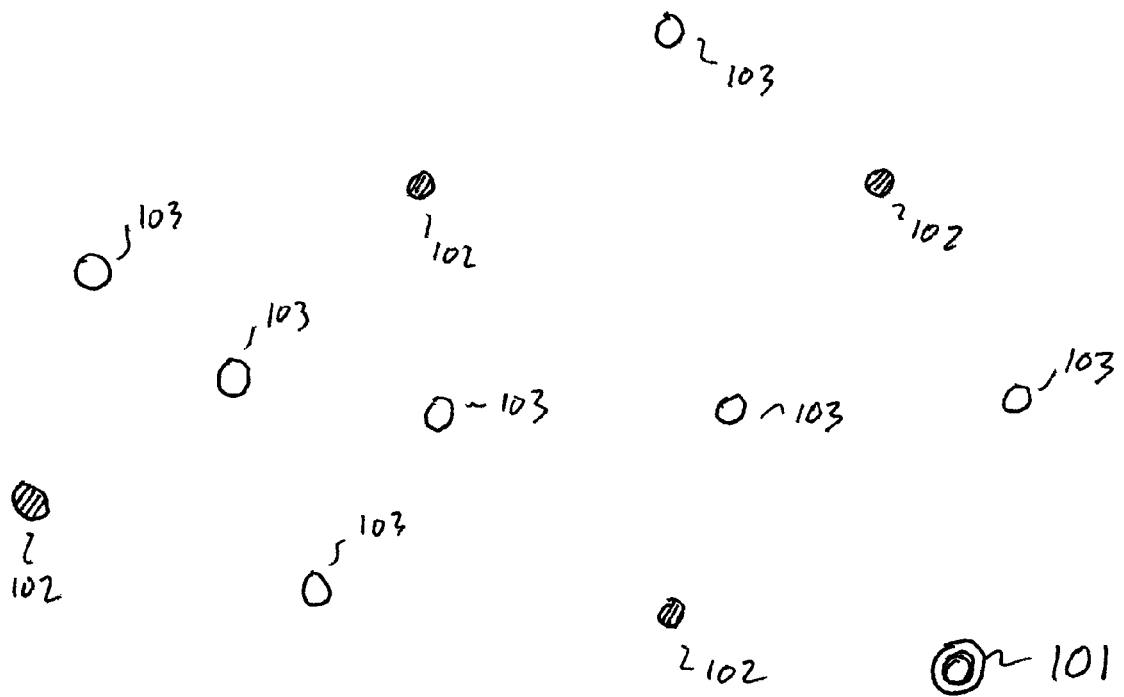
FIG. 1 shows an example wireless mesh network environment having multiple mesh networks, as may be used to practice some embodiments of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Mesh networks are often used to route data between various elements or nodes in a network made up of a number of loosely assembled nodes. Many mesh networks are designed such that a compatible node can easily join the network and receive and send data, including passing received data along a route to an intended destination node. Mesh networks are therefore often self-healing, in that if a node becomes inoperable or loses a connection to another node, data can be easily routed around the broken network link.

Many mesh network technologies use wireless communication, further enhancing the ease of use of mesh networking for certain applications. Because mesh network nodes are typically stationary, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network.

One example of a mesh network standard using wireless radio communication is the ZigBee mesh network, which was developed by an industry alliance and is related to IEEE standards including 802.15.4. The retail price of ZigBee-compliant transceivers is nearly a dollar, and a transceiver, memory, and processor can be bought for a few dollars in quantity, making integration of mesh network technology into inexpensive electronic devices economically practical. The standard is intended to support low power consumption at reasonably low data rates, and provides a self-organizing network technology that works well for applications such as control, monitoring, sensing, and home automation.

In this example of wireless mesh technology, one node operates as a coordinator, forming the root of the mesh network and performing other functions such as bridging to other networks and handling encryption keys. Most nodes are router nodes, which can receive and send data, including passing data along to other nodes. In some embodiments, end device nodes contain just enough functionality to receive and send data, but cannot route or pass data from a sending node to a different receiving node. While this preserves battery life and reduces the cost of the node, end device nodes are unable to contribute to the routing functions of the mesh network, and so will typically not make up a large percentage of a mesh network's nodes.

New nodes are able to join or synchronize to an existing network by searching known radio channels on which the mesh network technology operates, and in further examples by looking for other mesh network nodes broadcasting data having a PAN ID that matches the PAN ID of the network that the new node wishes to join. In an alternate embodiment, the PAN ID of a found network is adopted by the new node, which will not route data with other nodes having different PAN IDs once the network has been joined, even if on the same radio frequency channel.

But, effective mesh networking in wireless environments such as ZigBee becomes more difficult if multiple mesh networks are present. Past solutions include manually setting the desired channel and PAN ID of the intended network on each node so that the node searches for and joins only the intended network, but such solutions typically require that the network administrator uses a configuration tool to pre-configure each network node with information regarding the intended network.

Some embodiments of the invention seek to address this problem by providing a method for network devices in a multi-network wireless mesh network environment to identify themselves as members of the network. This is achieved in one example by receiving a broadcast message from a first mesh network device that has joined the wireless mesh network, and identifying that the broadcast transmission has been received such as by actuating a light, playing a sound, or sending an identifying reply message back to a broadcasting mesh network device. This indicator will make the other nodes in the network identifiable to an installer, who can easily determine which group of network nodes are a part of the joined network, ensuring that the desired network has been joined.

FIG. 1 shows an example mesh network environment having multiple mesh networks, consistent with an example embodiment of the invention. A new mesh network node 101 is being introduced into the mesh network environment, which here includes a first mesh network identified by nodes marked 102, and a second mesh network identified by nodes marked 103. Multiple mesh networks in the same physical environment are commonly found in environments such as where the mesh network nodes are security devices, sensors, industrial or process monitoring devices, and in other applications.

Here, the new mesh network node 101 wishes to join the first mesh network 102, and not the second mesh network 103. Traditionally, this involves identification of configuration information for mesh network 102, such as radio frequency channel, network ID, and other such information. This data would be pre-configured into the new node 101 such as by use of a configuration device or a link to a computer running configuration software to load the configuration information into the node 101.

Some embodiments of the invention provide a more efficient way for the new mesh network node 101 to identify which network it has joined in a multi-network wireless mesh network environment, such a by causing the other nodes in the joined network to identify themselves by sending a broadcast message to the other nodes across the mesh network, triggering an identification action.

In the example in the flowchart of FIG. 2, with reference to the wireless mesh network environment of FIG. 1, new node 101 has been powered on, and finds and joins mesh network 102 at 201. The node 101 either sends an identification broadcast message on its own after joining the network, or is prompted to send an identification broadcast message by the installer at 202. The identification broadcast message is sent only to those nodes in network 102, and is disregarded or not received by the nodes in network 103.

When the nodes in network 102 receive the identification broadcast message from new network device 101 as shown at 203, they indicate their membership in the same wireless mesh network, such as by flashing a light, playing a sound such as a beep, or sending a reply message back to the broadcasting node at 204. Identification actions such as a beep or flashing light allow the installer to quickly observe which nodes in the vicinity are members of the same network as the new wireless mesh network device at 205, ensuring that the device being configured is a member of the desired network.

If the wireless network device has joined or synchronized to the desired network, configuration is complete and no further action is necessary. If the desired network has not been joined, the installer can reconfigure the mesh network device to join another wireless mesh network, and repeat the identification broadcast process as illustrated in FIG. 2 to observe the nodes in the area that are members of the new network.

In a further example, the new wireless mesh network device obtains information in addition to a radio frequency channel or network identifier, such as a security or encryption key used to secure communication within the wireless network. This can be provided using various key exchange protocols, security certificates, or other suitable technologies to allow deployment of a new wireless network device in a wireless mesh network without requiring any preconfiguration.

The example methods for wireless mesh network identification presented here enable an installer to quickly determine which network a new wireless mesh network device has joined, and to observe which other nodes are members of the network. Example embodiments presented include use of simple identification broadcast messages to prompt other network nodes in a joined network to identify themselves, such as by flashing a light, making a noise, or other suitable action.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A method of identifying network devices in a multi-network wireless mesh network environment, wherein the multi-network wireless mesh network environment includes a plurality of first mesh network devices, wherein each first mesh network device includes a processor which is capable of transmitting an identification broadcast message and of receiving an identification broadcast message, the method comprising:
sending an identification broadcast message from a first mesh network device that has joined or synchronized to a first wireless mesh network to other first mesh network devices joined to the first wireless mesh network;
receiving the identification broadcast message at the other first mesh network devices; and
indicating, at each of the other first mesh network devices on the first wireless mesh network that received the identification broadcast message, that the network device is a member of the first wireless mesh network, wherein indicating includes providing a visible or audible indication on the network device that the network device is a member of the first wireless mesh network.

2. The method of identifying network devices in a multi-network wireless mesh network environment of claim 1, wherein sending the identification broadcast message is triggered by an installer.

3. The method of identifying network devices in a multi-network wireless mesh network environment of claim 2, wherein triggering sending the identification broadcast message comprises at least one of receiving input in the first mesh network device via a switch, a data interface, or a software command.

4. The method of identifying network devices in a multi-network wireless mesh network environment of claim 1, wherein on each of the other first mesh network devices on the first wireless mesh network that received the identification broadcast message, providing a visible or audible indication that the network device is a member of the first wireless mesh network comprises actuating a light or playing a sound.

5. The method of identifying network devices in a multi-network wireless mesh network environment of claim 4, wherein at least one of actuating a light and playing a sound comprises indicating at least one of a node ID or a network ID.

6. The method of identifying network devices in a multi-network wireless mesh network environment of claim 1, wherein indicating, at each of the other first mesh network devices on the first wireless mesh network that received the identification broadcast message, that the network device is a member of the first wireless mesh network further comprises sending a respective identifying reply message from each of the other first mesh network devices on the first wireless mesh network that received the identification broadcast message back to the first mesh network device.

7. A wireless mesh network device, comprising:
a wireless transceiver; and
a processor coupled to the wireless transceiver, the processor configured to cause the wireless network device to:
send a transmitted identification broadcast message to other network devices that have joined or synchronized to a wireless mesh network, and
in response to receiving a received identification broadcast message from another network device that has joined or synchronized to the wireless mesh network, to indicate that the wireless mesh network device is a member of the wireless mesh network by providing a visible or audible indication that the wireless mesh network device is a member of the wireless mesh network.

8. The wireless mesh network device of claim 7, wherein the processor is configured to cause the wireless network device to send the transmitted identification broadcast message when triggered by an installer.

9. The wireless mesh network device of claim 8, wherein the processor is configured to cause the wireless network device to be triggered by the installer by at least one of receiving input via a switch, a data interface, or a software command.

10. The wireless mesh network device of claim 7, wherein the processor is configured to cause the wireless network device to provide a visible or audible indication that the wireless mesh network device is a member of the wireless mesh network by at least one of actuating a light or playing a sound.

11. The wireless mesh network device of claim 10, wherein at least one of actuating a light and playing a sound comprises indicating at least one of a node ID or a network ID.

12. The wireless mesh network device claim 7, wherein the processor is configured to cause the wireless network device to further indicate that the wireless mesh network device is a member of the wireless mesh network by sending an identifying reply message back to the another network device that has joined or synchronized to the wireless mesh network.

13. A wireless mesh network comprising a plurality of network devices, each of the plurality of network devices comprising:
a wireless transceiver; and
a processor coupled to the wireless transceiver, the processor configured to cause that network device to send a transmitted identification broadcast message to other network devices that have joined or synchronized to the wireless mesh network, and
in response to receiving a received identification broadcast message from another network device that has joined or synchronized to the wireless mesh network, to indicate that the network device is a member of the wireless mesh network by providing a visible or audible indication that the network device is a member of the wireless mesh network.

14. The wireless mesh network of claim 13, wherein the processor in each of the plurality of network devices is configured to cause that network device to send the transmitted identification broadcast message when triggered by an installer.

15. The wireless mesh network of claim 14, wherein the processor in each of the plurality of network devices is configured to cause that network device to be triggered by the installer by at least one of receiving input via a switch, a data interface, or a software command.

16. The wireless mesh network of claim 13, wherein the processor in each of the plurality of network devices is configured to cause that network device to provide a visible or audible indication that the wireless mesh network device is a member of the wireless mesh network by at least one of actuating a light or playing a sound.

17. The wireless mesh network of claim 16, wherein at least one of actuating a light and playing a sound comprises indicating at least one of a node ID or a network ID.

18. The wireless mesh network claim 13, wherein the processor in each of the plurality of network devices is configured to cause that network device to further indicate that the wireless mesh network device is a member of the wireless mesh network by sending an identifying reply message back to the another network device that has joined or synchronized to the wireless mesh network.

19. A method of identifying network devices in a multi-network wireless mesh network environment, comprising:
   receiving a broadcast message from a first mesh network device that has joined or synchronized to a first wireless mesh network; and
   at each network device in the first wireless mesh network that receives the broadcast transmission, indicating to an installer that the network device is a member of the first wireless mesh network by providing a visible or audible indication that the network device is a member of the first wireless mesh network, in response to receiving the broadcast transmission from the first mesh network device.

20. The method of identifying network devices in a multi-network wireless mesh network environment of claim 19, wherein at each network device in the first wireless mesh network that receives the broadcast transmission, indicating to the installer that the network device is a member of the first wireless mesh network comprises at least one of actuating a light, playing a sound, and sending an identifying reply message back to the first mesh network device.

* * * * *